United States Patent

Körting et al.

[11] Patent Number: 5,613,782
[45] Date of Patent: Mar. 25, 1997

[54] SUPPORTING ROLLER BEARING

[75] Inventors: Reinhard Körting, Ennigerloh; Ludger Rübbelke, Rheda-Wiedenbrück; Hans auf dem Venne, Ennigerloh, all of Germany

[73] Assignee: Krupp Polysius AG, Beckum, Germany

[21] Appl. No.: 525,309

[22] Filed: Sep. 8, 1995

[30]      Foreign Application Priority Data

Sep. 23, 1994 [DE] Germany .......................... 44 34 116.4

[51] Int. Cl.⁶ .............................. F16C 19/50; F16C 13/04
[52] U.S. Cl. ............................ 384/549; 384/448; 384/583
[58] Field of Search .................................. 384/549, 558, 384/583, 448

[56]             References Cited

U.S. PATENT DOCUMENTS

| | | | |
|---|---|---|---|
| 3,174,810 | 3/1965 | Roubal | 384/549 |
| 3,188,155 | 6/1965 | Kemnitz | 384/549 |
| 3,517,915 | 6/1970 | Bovagne et al. | 384/549 |
| 3,561,132 | 2/1971 | Grone | 384/549 X |
| 5,429,440 | 7/1995 | Williams | 384/583 X |

*Primary Examiner*—Thomas R. Hannon
*Attorney, Agent, or Firm*—Learman & McCulloch

[57]             ABSTRACT

A supporting roller bearing for a rotary drum comprises a supporting roller, supporting on its outer surface a circumferential running surface of the rotary drum. The supporting roller is mounted with axial clearance. A measuring device determines the particular axial position of the supporting roller and is connected by way of a control unit to an adjusting arrangement to alter the angle between the axis of the supporting roller and the axis of the rotary drum as a function of the measured axial position of the supporting roller.

10 Claims, 5 Drawing Sheets

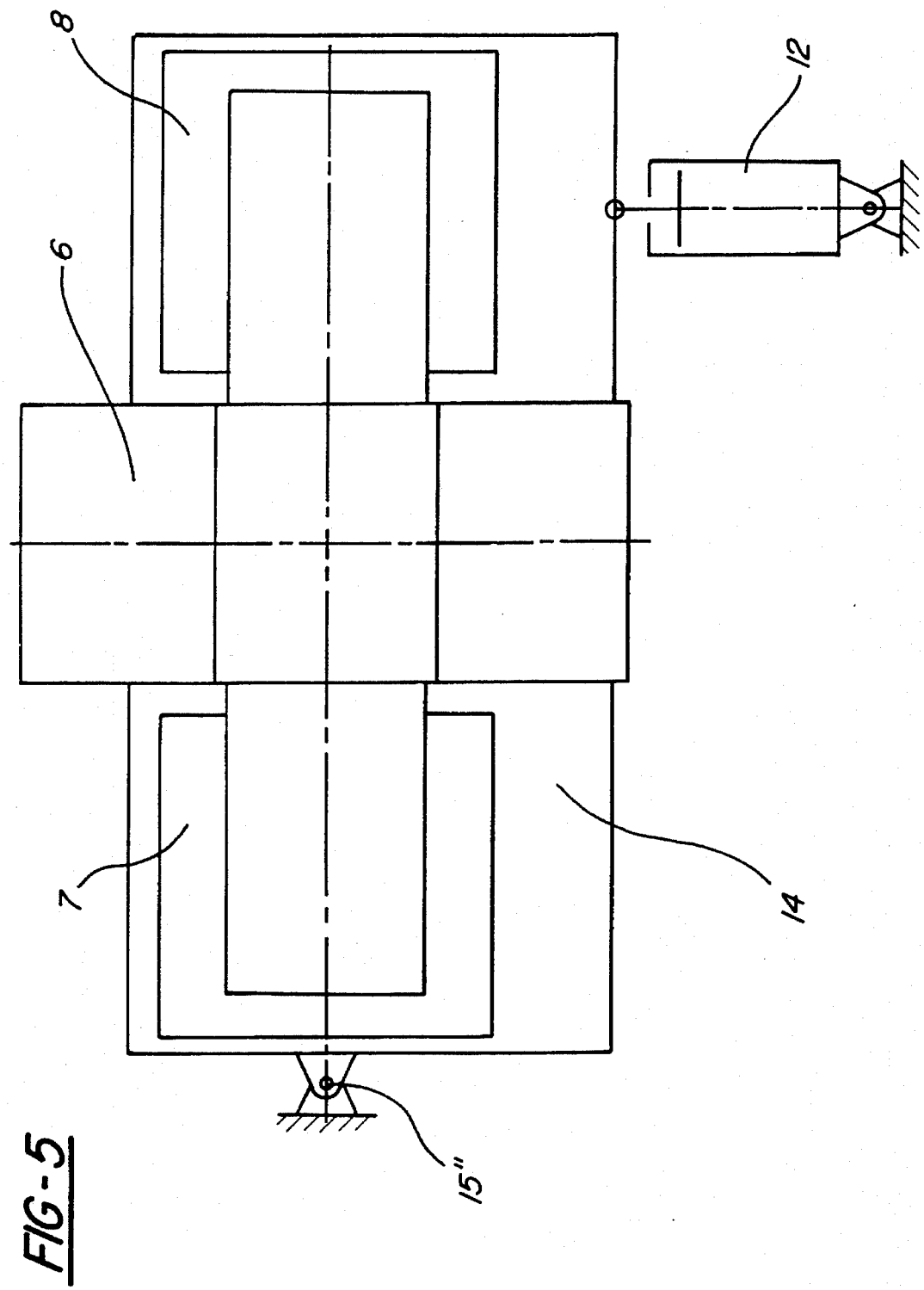

SUPPORTING ROLLER BEARING

The invention relates to a supporting roller bearing for supporting a rotary drum rotating about an axis of rotation, comprising a supporting roller which rotates about a bearing axis and has supported on its outer circumferential surface a circumferential running surface of the rotary drum, the supporting roller being mounted with axial clearance.

BACKGROUND OF THE INVENTION

It is desirable to keep the axial forces between the outer circumferential surface of the supporting roller and the circumferential running surface of the rotary drum as low as possible, in order thereby to reduce the transverse slippage in the transfer of the circumferential moment. For this purpose it is known in the art for the supporting rollers for supporting rotary drums with relatively large dimensions to be mounted so that they are floating with an axial clearance in the range of 5 to 10 mm.

However, this type of mounting has the disadvantage that in certain operating situations, for example in the case of offsetting of the bearing axes or settling of the foundation, the supporting rollers run onto the end limits of the bearing and as a result high axial forces occur between the outer circumferential surface of the supporting roller and the circumferential running surface of the rotary drum and correspondingly reduce the possibilities for transfer of the circumferential moment.

The object of the invention, therefore, is to make further developments to the supporting roller bearing in such a way that optimal transfer of the circumferential moment is possible in any operating situation.

SUMMARY OF THE INVENTION

The supporting roller bearing according to the invention is characterised in that a measuring arrangement is provided which is intended to determine the particular axial position of the supporting roller and is connected by way of a control unit to an adjusting arrangement which alters the angle between the bearing axis of the supporting roller and the axis of rotation of the rotary drum as a function of the measured position of the supporting roller.

In this way, by specific offsetting of the bearing axis the supporting roller can be prevented from running onto the end limits of the bearing.

The supporting roller is preferably kept approximately in a central position.

THE DRAWINGS

Presently preferred embodiments of the invention are shown in the drawings, wherein:

FIG. 1 shows a schematic representation of a rotary drum which is supported by two sets of supporting rollers, FIG. 2 shows a sectional representation along the line II—II in FIG. 1, FIG. 3 shows a sectional representation of a supporting roller bearing according to a first embodiment along the line III—III in FIG. 1, FIG. 4 shows schematic representation of a supporting roller bearing according to a second embodiment and FIG. 5 shows a schematic representation of a supporting roller bearing according to a third embodiment.

DETAILED DESCRIPTION

Figure 1:
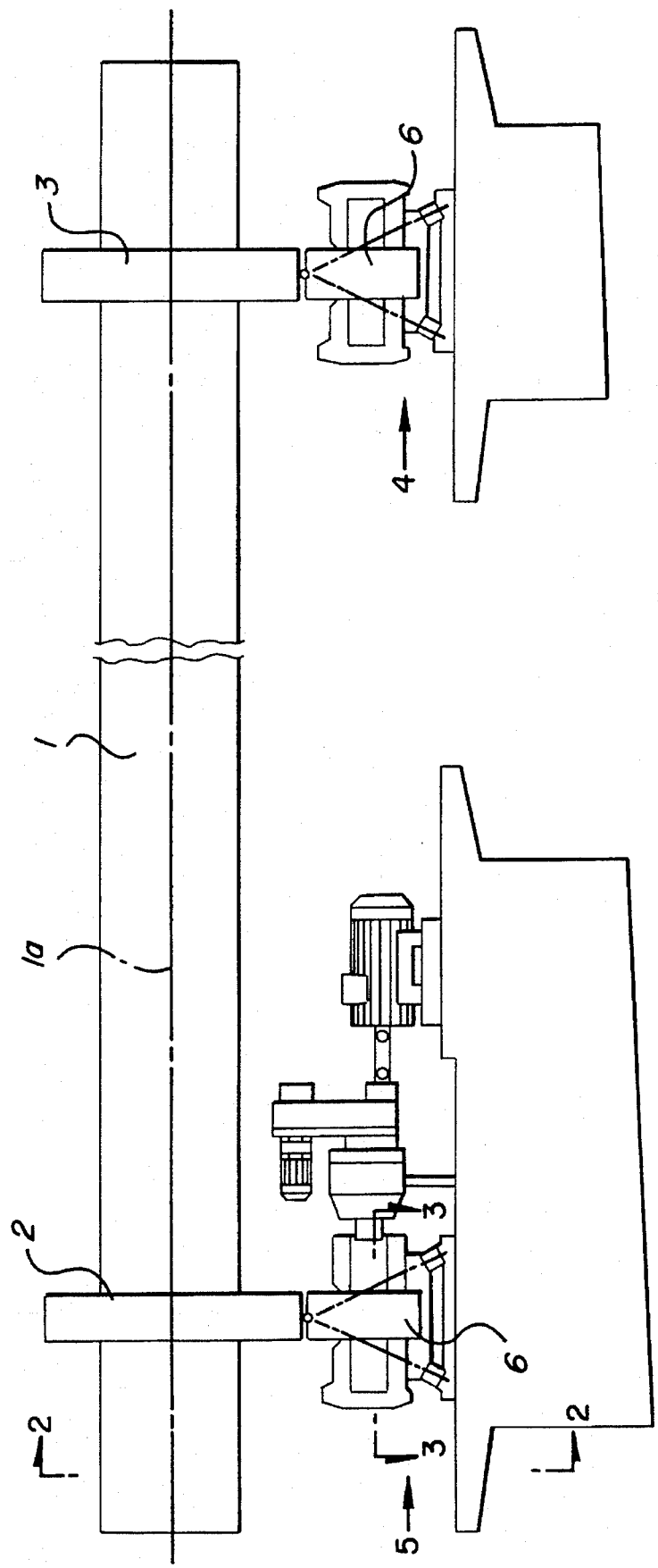
Figure 2:
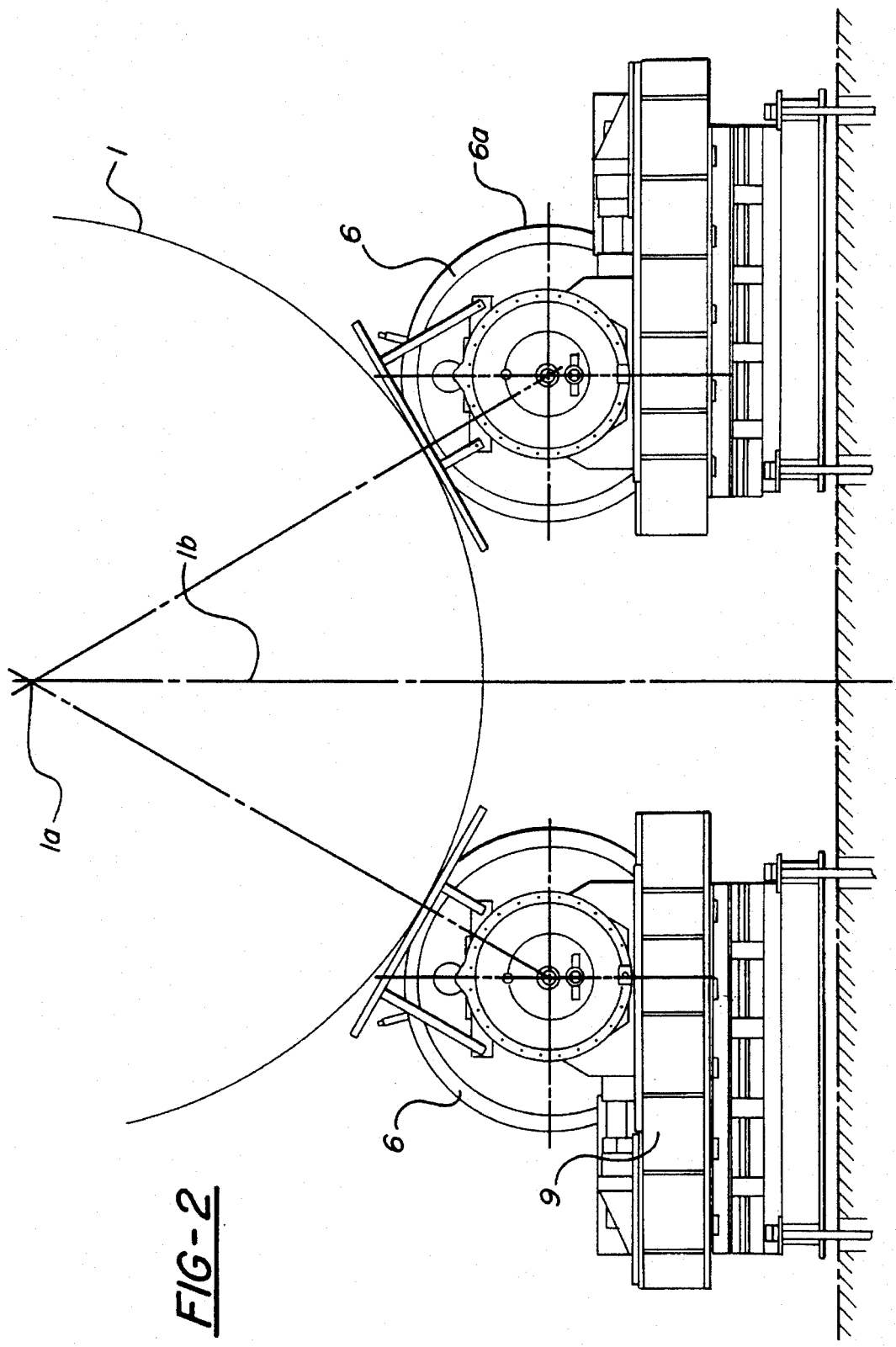

Designated by 1 in FIG. 1 is a rotary drum which has relatively large dimensions in diameter and length and is used in the art for various applications, such as for example in rotary kilns, rotary coolers, rotary drum dryers and the like. The rotary drum rotates about a drum an axis of rotation 1a and has a substantially cylindrical shell bearing two riding rings 2, 3 which are attached so as to be fixed against rotation at a suitable axial distance relative to one another. By means of these two riding rings 2, 3 the rotary drum 1 is rotatably mounted or supported on two supporting roller sets 4, 5. Each supporting roller set 4, 5 comprises—as FIG. 2 shows—two supporting rollers 6 which are disposed symmetrically on both sides of the vertical longitudinal central plane 1b of the rotary drum 1. The circumferential running surface of the rotary drum 1 is supported by the riding ring 3 so that it rolls on the outer circumferential surface (bearing surface) 6a of the supporting roller 6, and this circumferential running surface can also be constructed directly on the cylindrical shell of the rotary drum 1.

Figure 3:
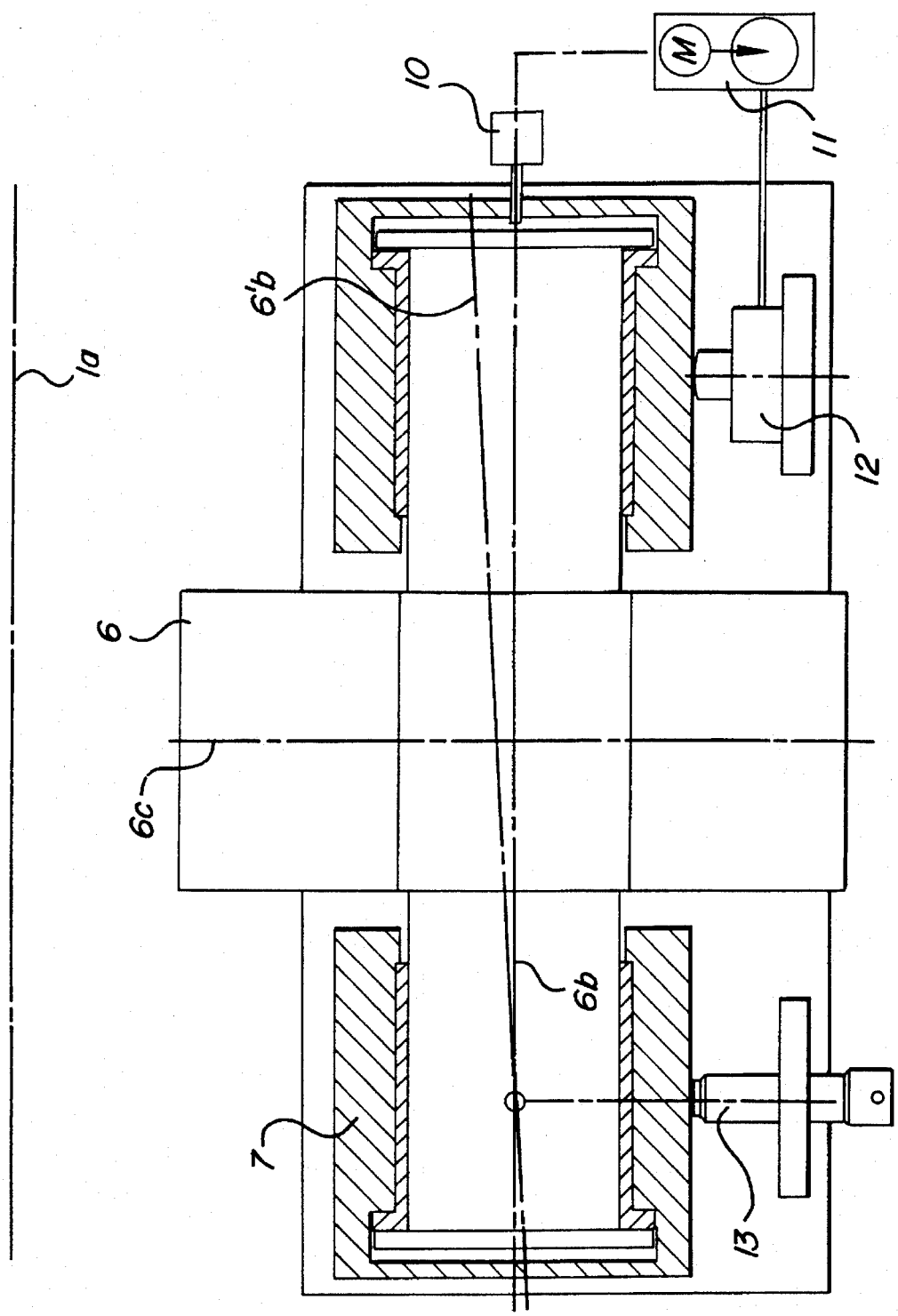

As can be seen in particular from FIG. 3, the supporting roller 6 is attached to a roller bearing axis 6b which is mounted at its ends so as to be freely rotatable in a first bearing 7 and a second bearing 8 which can be formed in the usual way by antifriction bearings or plain bearings. By means of this roller axis 6b and its bearings 7, 8 the supporting roller 6 is borne by a bearing structure 9 which for its part is tiltably supported relative to a stationary supporting surface.

The bearing axis 6b is mounted so that it is floating, i.e. with an axial clearance, in the two bearings 7, 8. In this way the supporting roller 6 can move to and fro in the axial direction about a central position 6c.

In certain operating situations, for example in the case of a tumbling movement of the circumferential running surface of the rotary drum, an offsetting of the bearing axes, or in the case of settling of the foundation, the supporting rollers 6 can run onto one of the two end limits of the mounting, so that high axial forces occur at the point of contact between the outer circumferential surface 6a of the supporting roller and the circumferential running surface of the rotary drum 1. In order to avoid this situation, according to the invention a measuring arrangement or means 10 is provided in order to determine the particular axial position of the supporting roller 6. This measuring arrangement 10 can be formed for example by a movement pick-up sensor which measures the alteration in position of the supporting roller on both sides of the central position 6c. However, it is also conceivable for this measuring arrangement to comprise two limit switches which are actuated before reaching the particular end limits.

The measuring arrangement 10 is connected to a control unit 11 by which an adjusting arrangement or adjustment means 12 is controlled. The adjusting arangement 12 is formed for example by a hydraulic cylinder which engages on one of the two bearings, in this case on the second bearing 8. The adjusting arrangement 12 could also be formed for example by a lilting spindle drive.

In the embodiment illustrated in the drawings the first bearing 7 is supported on an adjusting spindle 12. An adjustment of the adjusting arrangement 12 effects a rotation of the entire bearing arrangement about a center of rotation 15 which lies on the longitudinal central plane containing the bearing axis 6b at the height of the adjusting spindle 13. The position of the centre of rotation can essentially be chosen quite freely. It is merely necessary to ensure that by means of the adjusting arrangement 12 the angle between the bearing axis 6b of the supporting roller 6 and the axis of rotation 1a of the rotary drum 1 can be altered as a function of the measured position of the supporting roller. In FIG. 3 the central position 6'b of the bearing axis of the supporting roller is drawn in according to such an alteration. The adjusting arrangement acts approximately perpendicular to the vertical longitudinal central plane 1b of the rotary drum. As a function of the direction of rotation, the position of the supporting roller and the axial direction in which the supporting roller moves away from its central position, the adjusting arrangement 12 is supplied by the control unit 11 with a corresponding control signal so that the control cylinder effects either a displacement in the direction of the longitudinal central plane of the rotary drum or away therefrom. By means of the alteration of the bearing axis 6b in relation to the axis of rotation 1a of the rotary drum 1 the supporting roller again moves in the direction of its central position. Advantageously the adjusting arrangement is only actuated when the supporting roller has left a predetermined central region.

Within the scope of the invention the adjustment path of the adjusting arrangement 12 can be measured by a further measuring arrangement, for example a movement pick-up.

The alteration of the angle between the bearing axis 6b of the supporting roller and the axis of rotation 1a of the rotary drum is also referred to as an offsetting of the bearing axis.

The center of rotation or the axis of rotation of the offsetting movement caused by the adjusting arrangement 12 can be freely chosen within a wide range.

Figure 4:
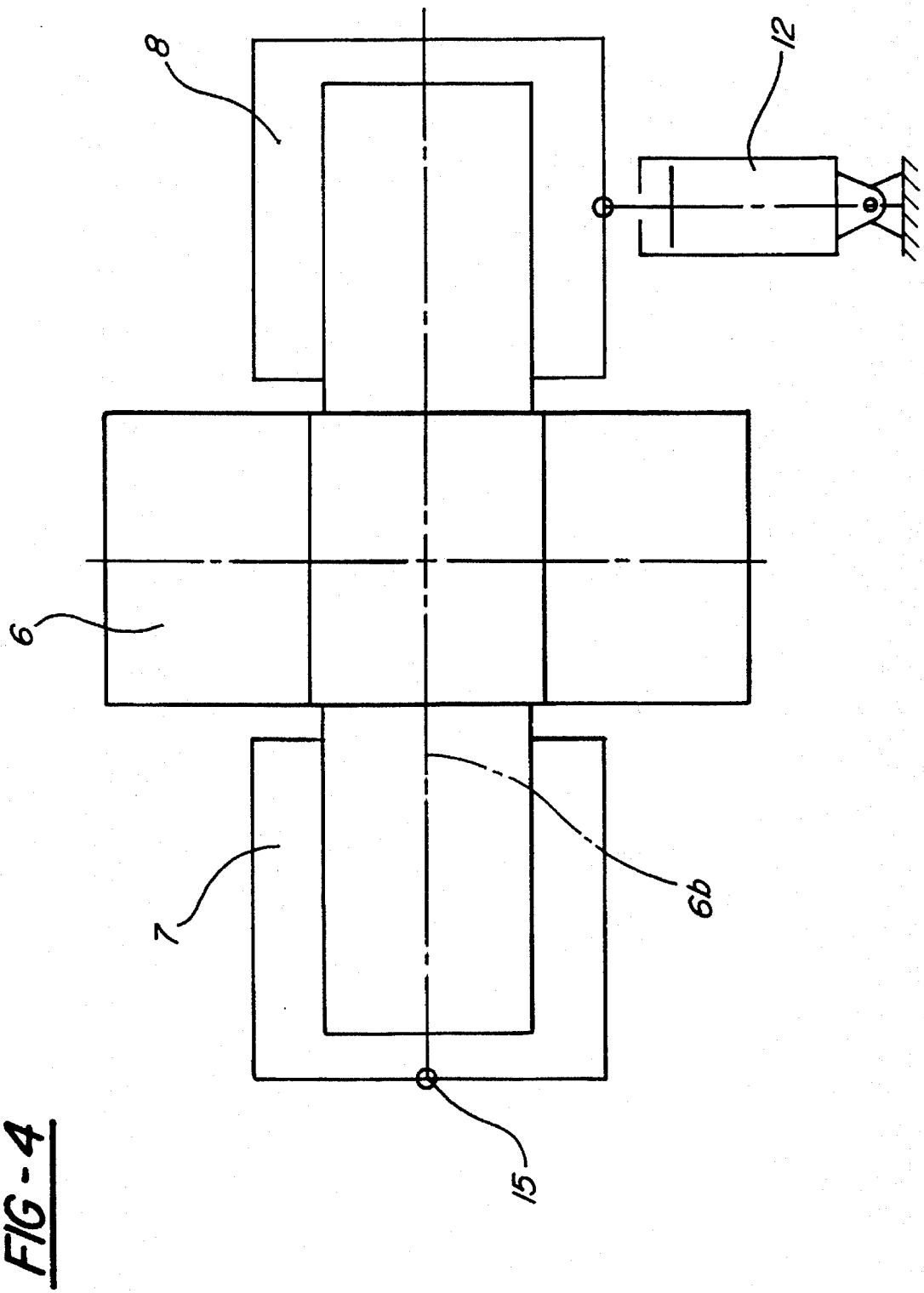

In FIG. 4 a second embodiment of a supporting roller bearing is shown, in which this center of rotation or the axis of rotation 15' lies even before the first bearing 7 in the axial direction.

In FIG. 5 a third preferred embodiment of a supporting roller bearing is shown, in which the supporting roller 6 with its first and second supporting roller bearings 7, 8 is disposed on a base plate 14 or a so-called soleplate. The center of rotation of this base plate 14 preferably lies in the central longitudinal plane of the supporting roller bearing which also contains the bearing axis 6b. The adjusting arrangement 12 can engage at any suitable point on the base plate 14, in which case either the adjusting arrangement 12 is mounted in a suitable manner or the contact region between the adjusting arrangement and the base plate is constructed in such a way that the pivot movement of the base plate or bearing arrangement caused by the adjustment is taken into account and it is not a matter of bracing between the adjusting arrangement 12 and the base plate 14.

The rotary drum can be driven for example by a so-called friction wheel drive, in which at least one of the supporting rollers is driven. In order to be able to transfer the necessary torque by way of the supporting rollers, however, with this type of drive the following conditions must be met:

1. the most uniform possible pattern of support between driving supporting rollers and riding ring;

2. the smallest possible axial forces on the contact surface between supporting roller and riding ring, since the transverse slippage reduces the transfer of the circumferential moment.

The first condition is met by the use of a so-called tiltable supporting roller set such as is also illustrated in FIG. 2. The second condition is satisfied particularly advantageously by the adjustment of the bearing arrangement according to the invention. However, the adjusting arrangement according to the invention can be used both in a tiltable and a rigid supporting roller construction.

We claim:

1. A roller bearing support construction for supporting a rotary drum rotatable about a drum axis of rotation, said construction comprising a supporting roller rotatable about a bearing axis having an outer bearing surface for supporting a circumferential running surface of the rotary drum, means mounting said roller to permit axial movement of said roller relative to a predetermined axial position, measuring means for measuring the axial position of said roller relative to said predetermined axial position, and adjustment means for altering the angular position of said bearing axis relative to said drum axis as a function of the measured axial position of said roller.

2. The construction according to claim 1 wherein said measuring means includes a movement pick-up sensor.

3. The construction according to claim 1 wherein said measuring means generates a signal for said adjustment means when said supporting roller is located beyond a predetermined central axial position.

4. The construction according to claim 1 wherein said adjustment means includes a hydraulic cylinder.

5. The construction according to claim 1 wherein said adjustment means includes a lifting spindle drive.

6. The construction according to claim 1 wherein the mounting means for said supporting roller comprises first and second supporting roller bearings, said adjustment means being operatively connected to one of said first and said second supporting roller bearings.

7. The construction according to claim 1 wherein the supporting means for said supporting roller comprises first and second supporting roller bearings disposed on a common base plate, said adjustment means being in operative relationship with the base plate.

8. The construction according to any one of the preceding claims wherein said adjustment means acts generally transversely of said drum axis.

9. The construction according to claim 1 including means for measuring a path of adjustment of said adjustment means.

10. Supporting roller bearing as claimed in claim 9 wherein said means for measuring comprises a movement pick-up sensor.

* * * * *